US012609353B2

(12) United States Patent
Tang et al.

(10) Patent No.: US 12,609,353 B2
(45) Date of Patent: Apr. 21, 2026

(54) POSITIVE ELECTRODE PIECE AND SECONDARY BATTERY INCLUDING SAME

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Hao Yuan, Zhuhai (CN); Chunyang Liu, Zhuhai (CN); Junyi Li, Zhuhai (CN); Yanming Xu, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 719 days.

(21) Appl. No.: 18/065,616

(22) Filed: Dec. 13, 2022

(65) Prior Publication Data

US 2023/0114916 A1 Apr. 13, 2023

Related U.S. Application Data

(63) Continuation of application No. PCT/CN2021/094181, filed on May 17, 2021.

(30) Foreign Application Priority Data

Jun. 29, 2020 (CN) ........................ 202010606376.2

(51) Int. Cl.
*H01M 10/0565* (2010.01)
*H01M 4/02* (2006.01)
*H01M 4/525* (2010.01)

(52) U.S. Cl.
CPC ....... *H01M 10/0565* (2013.01); *H01M 4/525* (2013.01); *H01M 2004/021* (2013.01); *H01M 2004/028* (2013.01); *H01M 2300/0082* (2013.01)

(58) Field of Classification Search
CPC .................... H01M 10/0565; H01M 2004/021
See application file for complete search history.

(56) References Cited

U.S. PATENT DOCUMENTS

| | | | | |
|---|---|---|---|---|
| 2009/0136854 | A1 | 5/2009 | Nakura | |
| 2018/0115006 | A1* | 4/2018 | Lee | C08J 3/24 |
| 2019/0386310 | A1* | 12/2019 | Daigle | C08F 212/10 |
| 2021/0020945 | A1* | 1/2021 | Lee | H01M 4/13 |

FOREIGN PATENT DOCUMENTS

| | | | |
|---|---|---|---|
| CN | 103682433 | A | 3/2014 |
| CN | 107591536 | A | 1/2018 |
| CN | 109071739 | A | 12/2018 |
| CN | 109216650 | A | 1/2019 |
| CN | 110003399 | A | 7/2019 |
| CN | 110137497 | A | 8/2019 |
| CN | 110943249 | A | 3/2020 |
| JP | 2003268053 | A | 9/2003 |
| JP | 5290699 | B2 | 9/2013 |

OTHER PUBLICATIONS

International Search Report and Written Opinion dated Aug. 17, 2021 for International Application No. PCT/CN2021/094181.
First Office Action dated Jul. 12, 2022 for Chinese Application No. 202010606376.2.

* cited by examiner

*Primary Examiner* — Maria Laios
*Assistant Examiner* — Benjamin T Lustgraaf

(57) ABSTRACT

A positive electrode piece and a secondary battery including the same. By selecting a type of polymer electrolyte prepared from a polymer different from that in the prior art as the solid electrolyte in the positive electrode piece, the solid electrolyte have both a bonding function and a lithium conduction function, may replace a binder and a solid electrolytes in an existing electrode piece, can effectively improve and enhance the lithium ion transmission performance, and reduce the internal resistance of the battery. Meanwhile, the positive electrode piece including the solid electrolyte has a low porosity, below about 5%, which greatly reduces voids and holes in the positive electrode piece, increases the content of the positive-electrode active material in unit volume, improves the transmission of lithium ions and electrons, and effectively improves the energy density, cycling performance and rate performance of the battery.

19 Claims, No Drawings

POSITIVE ELECTRODE PIECE AND SECONDARY BATTERY INCLUDING SAME

CROSS-REFERENCE TO RELATED APPLICATION

This application is a continuation of International Application No. PCT/CN2021/094181, filed on May 17, 2021, which claims priority to Chinese Patent Application No. 202010606376.2, filed on Jun. 29, 2020, both of which are hereby incorporated by reference in their entireties.

TECHNICAL FIELD

The present disclosure relates to the technical field of secondary batteries, in particular to a positive electrode piece and a secondary battery including the positive electrode piece.

BACKGROUND

Lithium-ion battery has advantages, such as long cycling life, high energy density, green and environmental friendly, and has been applied in energy storage field, power field, and digital field. With the urgent demand for high energy density batteries in the market, the traditional lithium-ion battery system is increasingly difficult to meet the market demand. The lithium-ion battery is mainly composed of a positive electrode, a negative electrode, a separator and an electrolyte. The electrolyte is mainly composed of an organic solvent. In a battery system with high energy density, the battery has safety problems such as leakage, fire, explosion, etc. Solid state batteries are expected to fundamentally improve the safety performance of the lithium-ion battery, and have received extensive attention at home and abroad.

Solid state battery is a strong competitor for the next generation of energy storage battery with high energy density. However, an all-solid electrolyte still faces a problem of excessive interfacial contact impedance, especially on the positive electrode side, which greatly restricts the application of the all-solid electrolyte. At present, a solid electrolyte mainly includes sulfide electrolyte, oxide electrolyte, polymer electrolyte, hydride electrolyte, etc., where sulfide electrolyte has the disadvantages of high interfacial impedance, unstable performance, etc., the oxide electrolyte has the disadvantages of low conductivity, poor interfacial contact, etc., the hydride electrolyte has the disadvantages of unstable performance, flammability and explosion, etc., and the polymer electrolyte has characteristics of good processability and low room-temperature conductivity.

At the same time, there are some problems in the positive electrode of the solid state battery, such as poor interfacial contact, high porosity, and oxidative decomposition of polymer electrolyte, which directly affect the cycling performance of the solid state battery.

SUMMARY

In order to overcome deficiencies of the prior art, the present disclosure aims to provide a positive electrode piece and a secondary battery including the positive electrode piece.

It was found through research that the positive electrode piece of a conventional all-solid state battery mainly includes a positive-electrode active material, a conductive agent, a binder and a solid electrolyte, where the positive-electrode active material, conductive agent, binder and solid electrolyte are uniformly mixed, and are coated on a surface of a current collector, and then are dried and cut to obtain the positive electrode piece for the solid state battery, and the positive electrode piece, the solid electrolyte and a negative electrode piece are laminated, to obtain a solid state lithium-ion battery. During charging and discharging process of a conventional all-solid state battery, there are problems such as poor interfacial contact between an electrode piece and a solid electrolyte, and high porosity on an electrode piece surface, which greatly affects the cycling performance of the solid state battery.

An object of the present disclosure is realized by the following technical solution:

a positive electrode piece, including a positive-electrode current collector and a positive-electrode active material layer coated on one or both surfaces of the positive-electrode current collector, where the positive-electrode active material layer includes a positive-electrode active material, a conductive agent and a polymer electrolyte, where the polymer electrolyte includes a polymer and a lithium salt, and the polymer includes a repeating unit as shown in Formula 1 below:

Formula 1

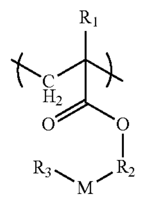

in Formula 1, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

According to the present disclosure, $R_1$ is selected from H or $C_{1-3}$ alkyl group; $R_2$ is a connecting group formed by a reaction of hydroxyl group in

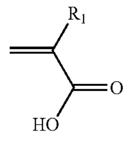

with $R_3'$ in

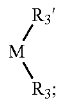

$R_3$ and $R_3'$ are the same or different, and are each independently selected from H, OH, COOH and $NH_2$ and cannot be H at the same time.

According to the present disclosure, the polyphenylene oxide chain segment has a repeating unit shown in Formula 2:

Formula 2

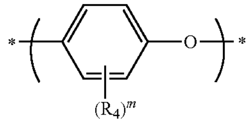

in Formula 2, $R_4$ is selected from H or $C_{1-6}$ alkyl group, and m is an integer between 0-4. Exemplarily, $R_4$ is selected from H or $C_{1-3}$ alkyl group, and m is an integer between 0-2;

the polyethylene glycol chain segment has a repeating unit shown in Formula 3:

Formula 3

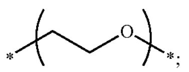

the polypropylene glycol chain segment has a repeating unit shown in Formula 4:

Formula 4

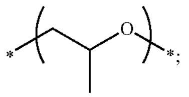

the polyethylene dithiol chain segment has a repeating unit shown in Formula 5:

Formula 5

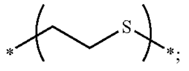

the polycarbonate chain segment has a repeating unit shown in Formula 6:

Formula 6

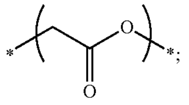

and the polysiloxane chain segment has a repeating unit shown in Formula 7:

Formula 7

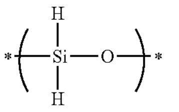

According to the present disclosure, the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

According to the present disclosure, a monomer for preparing the polymer is selected from a compound shown in Formula 8 below:

Formula 8

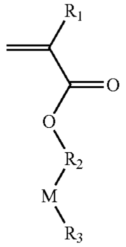

in Formula 8, $R_1$, $R_2$, $R_3$ and M are defined as above.

According to the present disclosure, the compound shown in Formula 8 is selected from at least one of polyphenylene oxide acrylate, polyethylene glycol methyl methacrylate, polycarbonate acrylate, polypropylene glycol methacrylate, poly(lithium-sulfonate) methacrylate, and polysiloxane methyl methacrylate.

According to the present disclosure, the positive-electrode active material layer includes the following components in mass percentage of content: 70-95 wt % of the positive-electrode active material, 2-15 wt % of the conductive agent, 3 -28 wt % of the above-mentioned polymer electrolyte and 0-10 wt % of a binder.

According to the present disclosure, in the polymer electrolyte, a molar ratio of other elements except carbon and hydrogen in the polymer to lithium element in the lithium salt is 5:1-25:1, such as 5:1, 10:1, 15:1, 20:1, 25:1, where the other elements except carbon and hydrogen can be, for example, oxygen, sulfur or silicon element.

According to the present disclosure, a porosity of the positive electrode piece is 0%-5%; and/or an elongation ratio of the positive-electrode active material layer in the positive electrode piece is 5%-500%.

The present disclosure further provides a solid state battery, and the solid state battery includes the positive electrode piece described above.

The beneficial effects of the present disclosure:

The present disclosure provides a positive electrode piece and a secondary battery including the positive electrode piece. The present disclosure selects a type of polymer electrolyte prepared from a polymer different from that in the prior art as the solid electrolyte in the positive electrode piece, the solid electrolyte have both a bonding function and a lithium conduction function, can replace a binder and a solid electrolyte in an existing electrode piece, can effectively improve and enhance transmission performance of the lithium ion, and reduce the internal resistance of the battery. Meanwhile, the positive electrode piece including the solid electrolyte has low porosity, below about 5%, which greatly reduces the voids and holes in the positive electrode piece, increases the content of the positive-electrode active material in unit volume, improves the transmission of lithium ions and electrons, and effectively improves the energy density, cycling performance and rate performance of the battery. The positive electrode piece including the solid electrolyte can be used in a battery system with high energy density, and broadens application field thereof.

DESCRIPTION OF EMBODIMENTS

<Positive Electrode Piece>

As above mentioned, the present disclosure provides a positive electrode piece, the positive electrode piece includes a positive-electrode current collector and a positive-electrode active material layer coated on one or both surfaces of the positive-electrode current collector, the positive-electrode active material layer includes a positive-electrode active material, a conductive agent and a polymer electrolyte, where the polymer electrolyte includes a polymer and a lithium salt, and the polymer includes a repeating unit as shown in Formula 1 below:

Formula 1

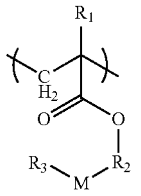

in Formula 1, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment , polycarbonate chain segment, polypropylene glycol chain segment or polysiloxane chain segment.

In an embodiment of the present disclosure, $R_1$ is selected from H or $C_{1-3}$ alkyl group, for example, $R_1$ is selected from H or methyl.

In an embodiment of the present disclosure, $R_2$ is a connecting group formed by a reaction of hydroxyl group in

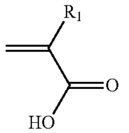

and $R_3$' in

In essence, $R_2$ is a residue of $R_3$', where $R_3$' is a capping group of M.

In an embodiment of the present disclosure, $R_3$ and $R_3$' are the same or different, and are each independently selected from H, OH, COOH, $NH_2$ and other capping group that can react with hydroxyl group, and cannot be H at the same time.

In an embodiment of the present disclosure, the polyphenylene oxide chain segment has a repeating unit shown in Formula 2:

Formula 2

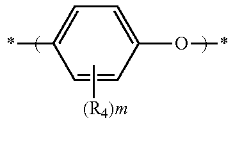

in Formula 2, $R_4$ is selected from H or $C_{1-6}$ alkyl group, and m is an integer between 0-4. Exemplarily, $R_4$ is selected from H or $C_{1-3}$ alkyl group, and m is an integer between 0-2; specifically, the polyphenylene oxide chain segment has a repeating unit shown in Formula 2':

Formula 2'

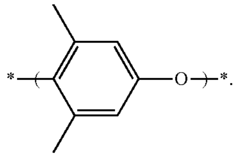

In an embodiment of the present disclosure, the polyethylene glycol chain segment has a repeating unit shown in Formula 3:

Formula 3

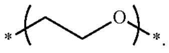

In an embodiment of the present disclosure, the polypropylene glycol chain segment has a repeating unit shown in Formula 4:

Formula 4

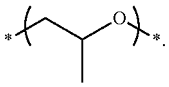

In an embodiment of the present disclosure, the polyethylene dithiol chain segment has a repeating unit shown in Formula 5:

Formula 5

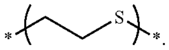

In an embodiment of the present disclosure, the polycarbonate chain segment has a repeating unit shown in Formula 6:

Formula 6

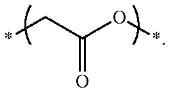

In an embodiment of the present disclosure, the polysiloxane chain segment has a repeating unit shown in Formula 7:

Formula 7

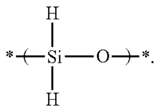

In an embodiment of the present disclosure, a number average molecular weight of M is 200-40000.

In an embodiment of the present disclosure, the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

In an embodiment of the present disclosure, a number average molecular weight of the polymer is 1000-300000, preferably 10000-200000.

In an embodiment of the present disclosure, a monomer for preparing the polymer is selected from a compound shown in Formula 8 below:

Formula 8

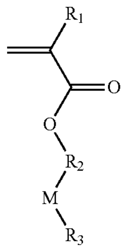

in Formula 8, $R_1$, $R_2$, $R_3$ and M are defined as above.

In an embodiment of the present disclosure, the compound shown in Formula 8 is selected from at least one of polyphenylene oxide acrylate, polyethylene glycol methyl methacrylate, polycarbonate acrylate, polypropylene glycol methacrylate, poly(lithium-sulfonate) methacrylate, and polysiloxane methyl methacrylate.

In an embodiment of the present disclosure, the positive-electrode active material layer includes the following components in mass percentage of content: 70-95 wt % of positive-electrode active material, 2-15 wt % of conductive agent, 3-28 wt % of the above-mentioned polymer electrolyte and 0-10 wt % of binder.

In an embodiment of the present disclosure, in the polymer electrolyte, a molar ratio of other elements except carbon and hydrogen in the polymer to lithium element in the lithium salt is 5:1-25:1, such as 5:1, 10:1, 15:1, 20:1, or 25:1, where the other elements except carbon and hydrogen can be, for example, oxygen, sulfur or silicon element.

Exemplarily, a content of the positive-electrode active material in mass percentage is 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, or 95 wt %.

Exemplarily, a content of the conductive agent in mass percentage is 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

Exemplarily, a content of the polymer electrolyte in mass percentage is 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, or 28 wt %.

Exemplarily, a content of the binder in mass percentage is 0 wt %, 1 wt %, 2 wt %, 3 wt %, 4 wt %, 5 wt %, 6 wt %, 7 wt %, 8 wt %, 9 wt %, or 10 wt %.

In an embodiment of the present disclosure, the positive-electrode active material is selected from one of or a combination of more of ferrous lithium phosphate ($LiFePO_4$), lithium cobaltate ($LiCoO_2$), lithium nickel cobalt manganate ($Li_zNi_xCo_yMn_{1-x-y}O_2$, where $0.95 \le z \le 1.05$, $x>0$, $y>0$, $0<x+y<1$), lithium manganate ($LiMnO_2$), lithium nickel cobalt aluminate ($Li_zNi_xCo_yAl_{1-x-y}O_2$, where $0.95 \le z \le 1.05$, $x>0$, $y>0$, $0.8 \le x+y<1$), lithium nickel cobalt manganese aluminate ($Li_zNi_xCo_yMn_wAl_{1-x-y-w}O_2$, where $0.95 \le z \le 1.05$, $x>0$, $y>0$, $w>0$, $0.8 \le x+y+w<1$), nickel cobalt aluminum tungsten material, lithium-rich manganese-based solid solution positive-electrode material ($xLi_2MnO_3.(1-x)\ LiMO_2$, where M=Ni/Co/Mn), lithium nickel cobaltate (LiNixCoyO$_2$, where $x>0$, $y>0$, $x+y=1$), lithium nickel titanium magnesate ($LiNi_xTi_yMg_zO_2$, where $x>0$, $y>0$, $z>0$, $x+y+z=1$), lithium nickelate ($Li_2NiO_2$), spinel lithium manganate ($LiMn_2O_4$), and nickel cobalt tungsten materials.

In an embodiment of the present disclosure, the lithium salt is selected from one of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium bisoxalate borate (LiBOB), lithium difluorooxalate borate (LiDFOB), lithium bis(difluorosulfonyl)imide (LiFSI), lithium bis(trifluoromethanesulphonyl)imide (LiTFSI), lithium trifluoromethylsulfonate ($LiCF_3SO_3$), lithium bismalonate borate (LiBMB), lithium malonate oxalate borate (LiMOB), lithium hexafluoroantimonate ($LiSbF_6$), lithium difluorophosphate ($LiPO_2F_2$), lithium 4,5 -dicyano-2-trifluoromethylimidazole (LiDTI), lithium bis(trifluoromethylsulfonyl)imine ($LiN(SO_2CF_3)_2$), $LiN(SO_2C_2F_5)_2$, $LiC(SO_2CF_3)_3$, and $LiN(SO_2F)_2$, or any combination thereof.

In an embodiment of the present disclosure, the conductive agent is selected from one or more of conductive carbon black, Ketjen black, conductive fiber, conductive polymer, acetylene black, carbon nanotube, graphene, flake graphite, conductive oxide and metal particle.

In an embodiment of the present disclosure, the binder is selected from at least one of polyvinylidene fluoride (PVDF), polytetrafluoroethylene (PTFE), polyvinylidene fluoride hexafluoropropylene and poly(lithium-acrylate) (PAALi).

In one embodiment of the present disclosure, the positive electrode piece is used in a solid state battery (such as an all-solid state battery).

In an embodiment of the present disclosure, a porosity of the positive electrode piece is 0%-5%.

In an embodiment of the present disclosure, an elongation ratio of the positive-electrode active material layer in the positive electrode piece is 5%-500%.

In an embodiment of the present disclosure, a surface density of the positive electrode piece is 5-30 mg/cm$^2$.

The present disclosure also provides a preparation method of the positive electrode piece, which includes the following steps: uniformly mixing a solvent, a positive-electrode active material, a conductive agent, a polymer monomer shown in Formula 8, an initiator and a lithium salt to prepare a positive electrode slurry; coating the positive electrode slurry on a surface of a positive-electrode current collector, and drying and hot pressing, to obtain the positive electrode piece.

In an embodiment of the present disclosure, the positive electrode slurry includes 200-1000 parts of the solvent, 70-95 parts of the positive-electrode active material, 2-15 parts of the conductive agent, 3-28 parts of the polymer monomer shown in Formula 8, the initiator and the lithium salt, and 0-10 parts of a binder; where a molar ratio of other elements except carbon and hydrogen in the polymer monomer shown in Formula 8 to lithium element in the lithium salt is 5:1-25:1, and an addition amount of the initiator is 0.05-1 wt % of the mass of the polymer monomer shown in Formula 8.

In an embodiment of the present disclosure, the initiator can be one or more of azodiisobutyronitrile, azodiisoheptonitrile, dimethyl azodiisobutyrate, benzoyl peroxide, tert-butyl peroxybenzoate, 4-(N,N-dimethylamino)ethyl benzoate, methyl o-benzoylbenzoate, and the like.

In an embodiment of the present disclosure, the solvent is selected from at least one of N-methylpyrrolidone, acetonitrile, hydrofluoroether, acetone, tetrahydrofuran, dichloromethane, pyridine, xylene and toluene.

In an embodiment of the present disclosure, the positive electrode slurry is preferably sieved positive electrode slurry, such as through a 200-mesh sieve.

In an embodiment of the present disclosure, a temperature of the drying is 60° C.-120° C., and time of the drying is 6-36 hours; further preferably, the drying is carried out under vacuum.

In an embodiment of the present disclosure, a temperature of the hot pressing is 50° C.-90° C., and time of the hot pressing is 5-60 minutes.

It was found through research that in the present disclosure, the positive-electrode active material, the conductive agent, optionally the binder, the polymer monomer, the initiator and the lithium salt are dissolved in the solvent, uniformly mixed, and coated on the surface of the current collector, and then is dried, hot pressed, and then the positive electrode piece of the present disclosure is obtained.

In the positive electrode slurry, the polymer monomer, due to its small molecular weight and short polymer chain segment, can be fully mixed with the positive-electrode active material, the conductive agent, optionally the binder and the lithium salt. After the solvent is removed, a highly efficient lithium conductive network has been formed in the positive-electrode active material layer, and is subjected to hot pressing under vacuum. On the one hand, the hot pressing is to initiate thermal polymerization of the polymer monomer, the polymer monomer is viscous liquid, semi-solid or solid at room temperature, and the polymer monomer becomes a flowable liquid at high temperature, can fully immerse into the internal voids of the electrode piece, and conducts thermal initiation polymerization in the voids, where the thermal initiation polymerization process (time and temperature) is adjustable to ensure the lithium conductivity of the positive electrode piece; on the other hand, the hot pressing polymer process under vacuum is adopted, the vacuum can remove air between particles inside the electrode piece, and the hot pressing can ensure compaction of the electrode piece, to be closer to the practical application. The above processes are mainly to ensure performance of the electrode piece with low void ratio, high lithium conductivity and high conductivity.

The present disclosure also provides a solid state battery, and the solid state battery includes the positive electrode piece described above.

The present disclosure also provides an electrical device, and the electrical device includes the positive electrode piece described above.

In an embodiment of the present disclosure, the electrical device is a digital appliance, a power tool, an energy storage device, an unmanned aerial vehicle, a household appliance, an energy storage product, an electric vehicle, an electric tool, and the like.

The present disclosure will be further described in detail below in combination with specific examples. It should be understood that the following examples are only to illustrate and explain the present disclosure, and should not be interpreted as a limitation on the scope of protection of the present disclosure. All technologies realized based on the above contents of the present disclosure are covered in the scope of protection of the present disclosure.

Unless otherwise specified, the experimental methods used in the following examples are conventional methods; and reagents, materials, and the like used in the following examples can be obtained from commercial sources unless otherwise specified.

EXAMPLE 1

1) Preparation of Positive Electrode Piece:

92 g of lithium cobaltate as positive-electrode active material , 3 g of polyphenylene oxide acrylate, 0.33 g of $LiBF_4$, 0.67 g of LiTFSI, 1 g of polyvinylidene fluoride (PVDF) as binder, 1 g of carbon black as conductive agent, 1 g of carbon nanotube as conductive agent, 0.01 g of azodiisobutyronitrile were mixed, 1000 g of N-methylpyrrolidone (NMP) was added, and stirred under the action of a vacuum mixer until the mixed system becomes a uniform flowable positive electrode slurry; the positive electrode slurry was applied evenly on an aluminum foil with a thickness of 10 μm; after drying at 60° C. for 36 hours, the electrode piece was obtained after vacuumization treatment, and the electrode piece was hot pressed at 50° C. for 60 minutes, and then cut to obtain the positive electrode piece.

2) Preparation of Negative Electrode Piece:

5 g of $SiO_x$ ($0<x<2$), 10 g of lithium metal powder, 3 g of conductive carbon black as conductive agent, and 1 g of oil based acrylate as binder were dissolved in 50 g of xylene, mixed evenly, and coated on a surface of a copper foil for a negative-electrode current collector, and then dried (temperature: 85° C., time: 5 h, argon gas), rolled and die cut, to obtain the negative electrode piece.

3) Preparation of Solid Electrolyte Film:

100 g of polyethylene oxide, 20 g of LiTFSI and 1000 g of acetonitrile were added into a reactor, stirred at a speed of 500 r/min, and stirred for 24 h under protection of inert gas, and then the slurry obtained was coated on a flat polytetrafluoroethylene plate, and the solid electrolyte film was obtained by removing the solvent.

4) Preparation Of Lithium-Ion Battery:

the positive electrode piece, the solid electrolyte film and the negative electrode piece obtained above were laminated to prepare a solid lithium-ion battery cell, which was welded and encapsulated, to obtain the lithium-ion battery.

Comparative Example 1-1

A specific process may refer to Example 1, where a main difference is that in the Comparative example 1-1, polyphenylene oxide is used to replace the polyphenylene oxide acrylate in Example 1; and other conditions are consistent with Example 1.

Comparative Example 1-2

A specific process may refer to Example 1, where a main difference is that a mixture of polyphenylene oxide and polyacrylate with the same mass as the polyphenylene oxide acrylate monomer is used in the Comparative example 1-2 to replace the polyphenylene oxide acrylate in Example 1, where a mass ratio of polyphenylene oxide and polyacrylate is a molecular weight ratio of polyphenylene oxide to acrylate in the polyphenylene oxide acrylate monomer; and other conditions are consistent with Example 1.

Other Examples and Other Comparative Examples

Specific processes may refer to Example 1, where main differences are the process conditions, addition amounts of respective components, and types of respective component materials. See Table 1 and Table 2 for details. Among them, Examples 1-6 in Table 1 further include 0.01 g of initiators, all of which are azodiisobutyronitrile. In the comparative examples in Table 2 where two polymers are added, addition amounts of the two polymers are a molecular weight ratio of the polymer chain segments to the poly(meth)acrylate in the polymer monomers added in corresponding examples. See description of the above Comparative example 1-2 for details.

TABLE 1

| No. | Solvent/g | Positive-electrode active material/g | Con-ductive agent/g | Polymer or monomer thereof/g | Lithium salt/g | Binder/g | Drying temperature (° C.) | Drying time (h) | Hot pressing temperature (° C.) | Hot pressing time (min) |
|---|---|---|---|---|---|---|---|---|---|---|
| Example 1 | 1000 | 92 | 2 | 3 | 2 | 1 | 60 | 36 | 50 | 60 |
| Comparative example 1-1 | 1000 | 92 | 2 | 3 | 2 | 1 | 60 | 36 | 50 | 60 |
| Comparative example 1-2 | 1000 | 92 | 2 | 3 | 2 | 1 | 60 | 36 | 50 | 60 |
| Example 2 | 600 | 75 | 8 | 12 | 5 | 0 | 90 | 24 | 65 | 10 |
| Comparative example 2-1 | 600 | 75 | 8 | 12 | 5 | 0 | 90 | 24 | 65 | 10 |
| Comparative example 2-2 | 600 | 75 | 8 | 12 | 5 | 0 | 90 | 24 | 65 | 10 |
| Example 3 | 400 | 70 | 5 | 12 | 3 | 10 | 120 | 6 | 80 | 15 |
| Comparative example 3-1 | 400 | 70 | 5 | 12 | 3 | 10 | 120 | 6 | 80 | 15 |
| Comparative example 3-2 | 400 | 70 | 5 | 12 | 3 | 10 | 120 | 6 | 80 | 15 |
| Example 4 | 500 | 90 | 3 | 6 | 1 | 0 | 110 | 16 | 90 | 5 |
| Comparative example 4-1 | 500 | 90 | 3 | 6 | 1 | 0 | 110 | 16 | 90 | 5 |
| Comparative example 4-2 | 500 | 90 | 3 | 6 | 1 | 0 | 110 | 16 | 90 | 5 |
| Example 5 | 800 | 80 | 6 | 10 | 4 | 0 | 100 | 8 | 75 | 30 |
| Comparative example 5-1 | 800 | 80 | 6 | 10 | 4 | 0 | 100 | 8 | 75 | 30 |
| Comparative example 5-2 | 800 | 80 | 6 | 10 | 4 | 0 | 100 | 8 | 75 | 30 |
| Example 6 | 200 | 70 | 8 | 12 | 8 | 2 | 80 | 30 | 55 | 35 |
| Comparative example 6-1 | 200 | 70 | 8 | 12 | 8 | 2 | 80 | 30 | 55 | 35 |
| Comparative example 6-2 | 200 | 70 | 8 | 12 | 8 | 2 | 80 | 30 | 55 | 35 |

TABLE 2

| No. | Solvent | Positive-electrode active material | Conductive agent | Polymer monomer/polymer | Binder | Lithium salt |
|---|---|---|---|---|---|---|
| Example 1 | NMP | Lithium cobaltate | Conductive carbon black: carbon nanotube (1:1) | Polyphenylene oxide acrylate (molecular weight of monomer 400; molecular weight of polymer 20000) | PVDF | $LiBF_4$:LiTFSI (1:2) |
| Comparative example 1-1 | | | | Polyphenylene oxide (molecular weight 20000) | | |
| Comparative example 1-2 | | | | Polyphenylene oxide (molecular weight 20000) + polyacrylate (molecular weight 20000) | | |
| Example 2 | Ace-tonitrile | Ferrous lithium phosphate | Conductive carbon black: Ketjen black (2:1) | Polyethylene glycol methyl methacrylate (molecular weight of monomer 950; molecular weight of polymer 100000) | None | LiFSI:LiTFSI (1:3) |
| Comparative example 2-1 | | | | Polypropylene glycol (molecular weight 100000) | | |
| Comparative example 2-2 | | | | Polypropylene glycol (molecular weight 100000) + polymethacrylate (molecular weight 100000) | | |
| Example 3 | DMF | Lithium-rich manganese-based material | Conductive fiber:carbon nanotube | Polycarbonate acrylate (molecular weight of monomer 1500; molecular weight of polymer150000) | PVDF | $LiBF_4$:LiFSI (3:1) |

TABLE 2-continued

| No. | Solvent | Positive-electrode active material | Conductive agent | Polymer monomer/polymer | Binder | Lithium salt |
|---|---|---|---|---|---|---|
| Comparative example 3-1 | | | (1:1) | Polycarbonate (molecular weight 150000) | | |
| Comparative example 3-2 | | | | Polycarbonate (molecular weight 150000) + polyacrylate (molecular weight 150000) | | |
| Example 4 | Acetone | Nickel cobalt manganese ternary material | Carbon nanotube: graphene (1:2) | Polyethylene glycol methyl methacrylate (molecular weight of monomer 300; molecular weight of polymer100000) | None | LiBOB: LiTFSI (1:4) |
| Comparative example 4-1 | | | | Polypropylene glycol (molecular weight:10000) | | |
| Comparative example 4-2 | | | | Polypropylene glycol (molecular weight: 10000) + polymethacrylate (molecular weight: 10000) | | |
| Example 5 | DMF | Nickel cobalt aluminum ternary material | Conductive carbon black: carbon nanotube (2:1) | Polypropylene glycol methacrylate (molecular weight of monomer 1000; molecular weight of polymer 50000) | None | LiFSI: LiTFSI (1:2) |
| Comparative example 5-1 | | | | Polypropylene glycol (molecular weight 50000) | | |
| Comparative example 5-2 | | | | Polypropylene glycol (molecular weight 50000) + polymethacrylate (molecular weight 50000) | | |
| Example 6 | NMP | Nickel cobalt manganese ternary material | Carbon nanotube: flake graphite (3:1) | polysiloxane methyl methacrylate (molecular weight of monomer 400; molecular weight of polymer 200000) | PVDF | $LiBF_4$: LiBOB: LiTFSI (1:2:3) |
| Comparative example 6-1 | | | | Polysiloxane (molecular weight 200000) | | |
| Comparative example 6-2 | | | | Polysiloxane (molecular weight 200000) + polymethacrylate (molecular weight 200000) | | |

Performance Test:

Test method for battery internal resistance alternating current impedance: alternating current impedance for lithium-ion battery is tested in 100 KHz-0.1 mHz range at 60° C., using Metrohm PGSTAT302N chemical workstation.

Test method for porosity of electrode piece: porosity of electrode piece is tested using mercury porosimeter with model 9610 under AutoPore V series, where a certain electrode piece is taken and placed in a dilatometer, which is coated with high-pressure sealing oil, covered and sealed with threads, and then placed in a high-pressure system to test the porosity of electrode piece under high pressure.

Test method for elongation ratio of electrode piece: positive electrode slurry is coated on a smooth and flat surface, dried and hot pressed, to obtain a slurry-coated layer, which is prepared to 60 mm*20 mm*1 mm (length*width*thickness) sample, and a tensile test is conducted on the sample on hydraulic universal material testing machine with model GH-969C.

Test method for battery cycling performance: a charge and discharge cycling test for a lithium-ion battery is conducted on a battery (from LANHE) charge and discharge test cabinet, with the test conditions being 60° C., 0.3 C/0.3 C charge and discharge, and cycling times when battery capacity retention rate drops to 80% are investigated.

Test method for battery cycling rate performance: a charge and discharge cycling test for a lithium-ion battery is conducted on a battery (from LANHE) charge and discharge test cabinet, with the test conditions being 60° C., and a process at 0.3 C/0.3 C (5 cycles)→0.5 C/0.5 C (5 cycles)→1 C/1 C (5 cycles)→2 C/2 C (5 cycles)→0.3 C/0.3 C (5 cycles) is carried out.

TABLE 3

Internal resistance of batteries, porosity of positive electrode pieces, and elongation ratio of positive-electrode active material layers in Examples and Comparative examples

| No. | Porosity (%) | Elongation ratio (%) | Internal resistance (mΩ) |
|---|---|---|---|
| Example 1 | 2 | 30 | 120 |
| Comparative example 1-1 | 30 | 10 | 560 |
| Comparative example 1-2 | 27 | 5 | 930 |
| Example 2 | 1 | 450 | 113 |
| Comparative example 2-1 | 27 | 200 | 530 |
| Comparative example 2-2 | 25 | 80 | 895 |
| Example 3 | 4 | 260 | 128 |
| Comparative example 3-1 | 26 | 240 | 630 |
| Comparative example 3-2 | 25 | 50 | 937 |
| Example 4 | 0.5 | 50 | 103 |
| Comparative example 4-1 | 25 | 23 | 421 |
| Comparative example 4-2 | 29 | 6 | 774 |
| Example 5 | 4.5 | 200 | 146 |
| Comparative example 5-1 | 23 | 120 | 621 |
| Comparative example 5-2 | 21 | 70 | 1062 |
| Example 6 | 0.8 | 230 | 153 |
| Comparative example 6-1 | 24 | 140 | 624 |
| Comparative example 6-2 | 26 | 90 | 1085 |

The porosity test results show that: in the examples, the positive electrode pieces prepared by using the compound shown in Formula 8, has low porosity; in the comparative examples, formed polymers adopted cannot achieve the effect of low porosity. A main reason is that the compound shown in Formula 8 adopted in the present disclosure is a polymer monomer, which is liquid under heat condition, and can fully contact with particles, enter voids between particles, and achieve in-situ polymerization in the voids, that is, preparing a positive electrode piece with low porosity.

The test results of elongation ratio show that: by comparing the elongation ratios of the positive-electrode active material layers in Examples 1-6, it can be seen that the elongation ratio of the positive-electrode active material layer is related to the amount of polymer monomer added, and the more the polymer monomer added, the better the elongation ratio; by comparing the examples with the comparative examples, the compound shown in Formula 8 in the present disclosure has obvious comb-like polymer function, where the main chain is carbon-carbon bond, and the branch chain is comb like, and the compound can effectively combine with particle materials in the positive electrode piece, has good high elasticity state, and has good elongation ratio.

The battery internal resistance test results show that: the compound shown in Formula 8 adopted in the examples of the present disclosure can effectively bond particles in the positive electrode piece together, and meanwhile, the polymer has a comb-like structure, and the branch chain can conduct lithium, so the positive electrode pieces prepared in Examples 1-6 have a low internal resistance. However, there is a high porosity in the comparative examples and the polyacrylate does not conduct lithium, so the positive electrode pieces prepared in the comparative examples have a high internal resistance.

TABLE 4

Cycling performance and rate performance of batteries of Examples and Comparative examples

| No. | Cycling 0.3 C/0.3 C performance | Battery capacity retention ratio after 5 cycles at different rate 0.3 C/0.3 C | 0.3 C/0.3 C | 1 C/1 C | 2 C/2 C | 0.3 C/0.3 C |
|---|---|---|---|---|---|---|
| Example 1 | 860 cycles (80%) | 99.93% | 98.35% | 95.47% | 90.34% | 99.70% |
| Comparative example 1-1 | 300 cycles (80%) | 98.38% | 96.23% | 91.48% | 85.85% | 97.52% |
| Comparative example 1-2 | 180 cycles (80%) | 96.24% | 92.41% | 85.34% | 78.93% | 93.43% |
| Example 2 | 2800 cycles (80%) | 99.98% | 98.67% | 96.35% | 92.63% | 99.83% |
| Comparative example 2-1 | 1500 cycles (80%) | 98.56% | 96.76% | 91.63% | 85.94% | 97.93% |
| Comparative example 2-2 | 650 cycles (80%) | 96.47% | 93.54% | 85.94% | 79.49% | 94.62% |
| Example 3 | 360 cycles (80%) | 98.89% | 97.42% | 92.34% | 87.43% | 98.21% |
| Comparative example 3-1 | 164 cycles (80%) | 94.32% | 92.54% | 84.34% | 76.37% | 92.36% |
| Comparative example 3-2 | 89 cycles (80%) | 87.34% | 84.37% | 73.47% | 64.95% | 85.48% |
| Example 4 | 1520 cycles (80%) | 99.95% | 98.43% | 96.14% | 92.47% | 99.75% |
| Comparative example 4-1 | 794 cycles (80%) | 98.32% | 96.48% | 91.42% | 85.12% | 97.21% |
| Comparative example 4-2 | 485 cycles (80%) | 96.12% | 93.11% | 85.32% | 79.11% | 94.13% |
| Example 5 | 1629 cycles (80%) | 99.96% | 98.51% | 96.21% | 92.52% | 99.81% |
| Comparative example 5-1 | 820 cycles (80%) | 98.41% | 96.53% | 91.51% | 85.81% | 97.50% |
| Comparative example 5-2 | 368 cycles (80%) | 96.23% | 93.26% | 85.41% | 79.32% | 94.43% |
| Example 6 | 1028 cycles (80%) | 99.94% | 98.61% | 95.62% | 91.21% | 99.76% |
| Comparative example 6-1 | 521 cycles (80%) | 99.31% | 97.13% | 92.56% | 87.81% | 98.11% |
| Comparative example 6-2 | 221 cycles (80%) | 97.25% | 93.49% | 86.73% | 79.84% | 94.42% |

The results of the cycling performance tests for the examples and the comparative examples show that: the positive electrode pieces of the present disclosure have a low porosity and a small internal resistance, which makes that the batteries prepared have an advantage in cycling performance; however, the positive electrode pieces in the comparative examples have a high porosity and a high internal resistance, leading to a significant reduction of the effective cycling times of the batteries.

The results of the charge-discharge rate performance test for the examples and the comparative examples show that: the positive electrode pieces of the present disclosure have a low porosity and a small internal resistance, and the lithium ions have good lithium conductive channels in the positive electrode pieces, which makes that the prepared lithium-ion batteries have good rate performance and good application value.

The embodiments of the present disclosure have been described above. However, the present disclosure is not limited to the above embodiments. Any modification, equivalent replacement, improvement, and the like made within the spirit and principle of the present disclosure shall be included in the protection scope of the present disclosure.

What is claimed is:

1. A positive electrode piece, wherein the positive electrode piece comprises a positive-electrode current collector and a positive-electrode active material layer coated on one or both surfaces of the positive-electrode current collector, the positive-electrode active material layer comprises a positive-electrode active material, a conductive agent and a polymer electrolyte, wherein the polymer electrolyte comprises a polymer and a lithium salt, and the polymer comprises a repeating unit as shown in Formula 1 below:

Formula 1

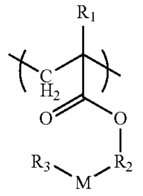

in Formula 1, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment;

wherein $R_1$ is selected from H or $C_{1-3}$ alkyl group; $R_2$ is a connecting group formed by a reaction of hydroxyl group in

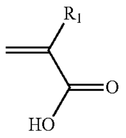

and $R_3$' in

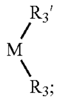

$R_3$ and $R_3$' are the same or different, and are each independently selected from H, OH, COOH and $NH_2$ and are not H at the same time.

2. The positive electrode piece according to claim 1, wherein the polyphenylene oxide chain segment has a repeating unit shown in Formula 2:

Formula 2

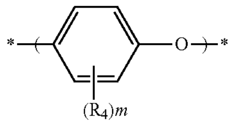

in Formula 2, $R_4$ is selected from H or $C_{1-6}$ alkyl group, and m is an integer between 0-4;

the polyethylene glycol chain segment has a repeating unit shown in Formula 3:

Formula 3

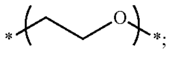

the polypropylene glycol chain segment has a repeating unit shown in Formula 4:

Formula 4

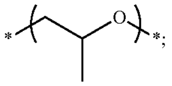

the polyethylene dithiol chain segment has a repeating unit shown in Formula 5:

Formula 5

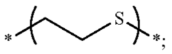

the polycarbonate chain segment has a repeating unit shown in Formula 6:

Formula 6

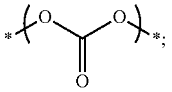

and the polysiloxane chain segment has a repeating unit shown in Formula 7:

Formula 7

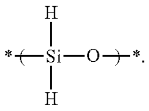

3. The positive electrode piece according to claim 2, wherein $R_4$ is selected from H or $C_{1-3}$ alkyl group, and m is an integer between 0-2.

4. The positive electrode piece according to claim 1, wherein the polyphenylene oxide chain segment has a repeating unit shown in Formula 2:

Formula 2

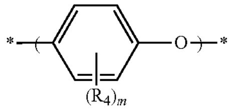

in Formula 2, $R_4$ is selected from H or $C_{1-6}$ alkyl group, and m is an integer between 0-4;

the polyethylene glycol chain segment has a repeating unit shown in Formula 3:

Formula 3

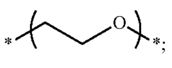

the polypropylene glycol chain segment has a repeating unit shown in Formula 4:

Formula 4

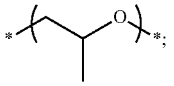

the polyethylene dithiol chain segment has a repeating unit shown in Formula 5:

Formula 5

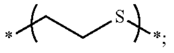

the polycarbonate chain segment has a repeating unit shown in Formula 6:

Formula 6

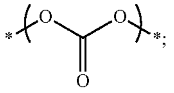

and the polysiloxane chain segment has a repeating unit shown in Formula 7:

Formula 7

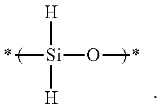

5. The positive electrode piece according to claim 4, wherein $R_4$ is selected from H or $C_{1-3}$ alkyl group, and m is an integer between 0-2.

6. The positive electrode piece according to claim 1, wherein the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

7. The positive electrode piece according to claim 1, wherein the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

8. The positive electrode piece according to claim 2, wherein the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

9. The positive electrode piece according to claim 4, wherein the polymer is selected from at least one of polyphenylene oxide polyacrylate, polyethylene glycol polymethylmethacrylate, polyethylene dithiol polymethylmethacrylate, polycarbonate polyacrylate, polypropylene glycol polymethylacrylate, and polysiloxane polymethylmethacrylate.

10. The positive electrode piece according to claim 1, wherein a monomer for preparing the polymer is selected from a compound shown in Formula 8 below:

Formula 8

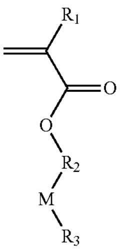

in Formula 8, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

11. The positive electrode piece according to claim 1, wherein a monomer for preparing the polymer is selected from a compound shown in Formula 8 below:

Formula 8

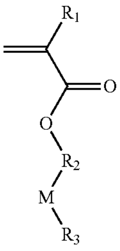

in Formula 8, $R_1$ is selected from H or $C_{1-3}$ alkyl group; $R_2$ is a connecting group formed by a reaction of hydroxyl group in

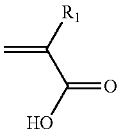

and $R_3$' in

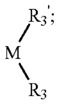

$R_3$ and $R_3$' are the same or different, and are each independently selected from H, OH, COOH and $NH_2$ and are not H at the same time; M is selected from polyphenylene oxide chain segment, polyethylene glycol chain segment, polyethylene dithiol chain segment, polycarbonate chain segment, polypropylene glycol chain segment or polysiloxane chain segment.

12. The positive electrode piece according to claim 2, wherein a monomer for preparing the polymer is selected from a compound shown in Formula 8 below:

Formula 8

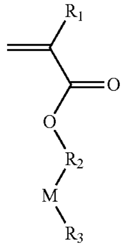

in Formula 8, $R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

13. The positive electrode piece according to claim 4, wherein a monomer for preparing the polymer is selected from a compound shown in Formula 8 below:

Formula 8

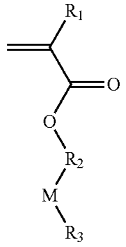

in Formula 8, $R_1$ is selected from H or $C_{1-3}$ alkyl group; $R_2$ is a connecting group formed by a reaction of hydroxyl group in

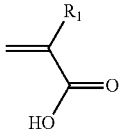

and $R_3'$ in

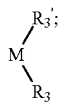

$R_3$ and $R_3'$ are the same or different, and are each independently selected from H, OH, COOH and $NH_2$ and are not H at the same time; M is selected from polyphenylene oxide chain segment, polyethylene glycol chain segment, polyethylene dithiol chain segment, polycarbonate chain segment, polypropylene glycol chain segment or polysiloxane chain segment.

14. The positive electrode piece according to claim 6, wherein a monomer for preparing the polymer is selected from a compound shown in Formula 8 below:

Formula 8

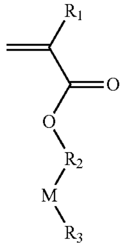

in Formula 8,$R_1$ is selected from H or $C_{1-6}$ alkyl group; $R_2$ is selected from a connecting group; $R_3$ is selected from a capping group; M is selected from polyphenylene oxide chain segment, polyethylene glycol chain segment, polyethylene dithiol chain segment, polycarbonate chain segment, polypropylene glycol chain segment or polysiloxane chain segment.

15. The positive electrode piece according to claim 10, wherein the compound shown in Formula 8 is selected from at least one of polyphenylene oxide acrylate, polyethylene glycol methyl methacrylate, polycarbonate acrylate, polypropylene glycol methacrylate, poly (lithium-sulfonate) methacrylate, and polysiloxane methyl methacrylate.

16. The positive electrode piece according to claim 1, wherein the positive-electrode active material layer comprises the following components in mass percentages of content: 70-95wt % of the positive-electrode active material, 2-15wt % of the conductive agent, 3- 28wt % of the polymer electrolyte and 0-10wt % of a binder.

17. The positive electrode piece according to claim 1, wherein in the polymer electrolyte, a molar ratio of other elements except carbon and hydrogen in the polymer to lithium element in the lithium salt is 5:1-25:1.

18. The positive electrode piece according to claim 1, wherein a porosity of the positive electrode piece is 0%- 5%; and/or an elongation ratio of the positive-electrode active material layer in the positive electrode piece is 5%- 500%.

19. A solid state battery, comprising the positive electrode piece according to claim 1.

* * * * *